United States Patent
Liu et al.

(10) Patent No.: US 12,507,159 B2
(45) Date of Patent: Dec. 23, 2025

(54) METHOD AND APPARATUS FOR RECOVERING RRC CONNECTION, AND COMPUTER STORAGE MEDIUM

(71) Applicant: GUANGDONG OPPO MOBILE TELECOMMUNICATIONS CORP., LTD., Dongguan (CN)

(72) Inventors: Jianhua Liu, Dongguan (CN); Ning Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/200,324

(22) Filed: May 22, 2023

(65) Prior Publication Data
US 2023/0309000 A1    Sep. 28, 2023

Related U.S. Application Data (63) Continuation of application No. 17/008,449, filed on Aug. 31, 2020, now Pat. No. 11,700,571, which is a continuation of application No. PCT/CN2018/085855, filed on May 7, 2018.

(51) Int. Cl.
*H04W 48/16* (2009.01)
*H04W 68/00* (2009.01)
*H04W 76/19* (2018.01)

(52) U.S. Cl.
CPC .......... *H04W 48/16* (2013.01); *H04W 68/00* (2013.01); *H04W 76/19* (2018.02)

(58) Field of Classification Search
CPC ...... H04W 48/16; H04W 76/19; H04W 68/00

USPC ......................................................... 370/329
See application file for complete search history.

(56) References Cited

U.S. PATENT DOCUMENTS

| 2017/0181216 A1* | 6/2017 | Worrall ................. H04W 76/19 |
| 2017/0202050 A1 | 7/2017 | Deng | |

FOREIGN PATENT DOCUMENTS

| CN | 106470417 A | 3/2017 |
| CN | 106961712 A | 7/2017 |
| CN | 106961747 A | 7/2017 |
| CN | 107046735 A | 8/2017 |

(Continued)

OTHER PUBLICATIONS

Supplementary European Search Report issued in corresponding European Patent Application No. EP 18 91 7750, mailed on Dec. 7, 2020, 12 pages.

(Continued)

*Primary Examiner* — Chuck Huynh
(74) *Attorney, Agent, or Firm* — BAYES PLLC (57) ABSTRACT

Disclosed are a method and apparatus for recovering an RRC connection, and a computer storage medium. The method comprises: a target base station receiving an RRC connection recovery request message sent by a terminal; the target base station determining, according to a UE identifier in the RRC connection recovery request message, a first node served by the terminal, and acquiring a UE context from the first node, wherein the UE context comprises a first UE context at the first node side and a second UE context at a second node side; and the target base station sending an RRC connection recovery message to the terminal, so that the terminal recovers an RRC connection.

17 Claims, 4 Drawing Sheets

(56) References Cited

FOREIGN PATENT DOCUMENTS

| CN | 107371275 | A | 11/2017 |
|---|---|---|---|
| CN | 107454679 | A | 12/2017 |
| CN | 107666692 | A | 2/2018 |
| CN | 107666693 | A | 2/2018 |
| CN | 107959953 | A | 4/2018 |
| KR | 20150036818 | A | 4/2015 |
| WO | 2017164908 | A1 | 9/2017 |
| WO | 2018019057 | A1 | 2/2018 |
| WO | 2019213805 | A1 | 11/2019 |

OTHER PUBLICATIONS

"Suspension of UE to RRC_INACTIVE in MR dual connectivity", Agenda item: 10.2.14; Source: Samsung, 3 GPP TSG-RAN WG2 2018 RAN2 Ad-hoc Meeting, R2-1801417, Vancouver, Canada, Jan. 21-25, 2018, 4 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); 3GPP TS 36.300 V13.10.0 (Dec. 2017), 313 pages.

'3rd Generation Partnership Project; Technical Specification Group Radio Access Network; NG-RAN; Xn application protocol (XnAP) (Release 15); 3GPP TS 38.423 V0.0.0 (Apr. 2018), 109 pages.

"RRC_INACTIVE with MR_DC", Agenda item: 10.6, Source: Qualcomm Incorporated, 3GPP TSG-RAN WG3 Meeting NR Ad-Hoc 2, R3-172430, Qingdao, China Jun. 27-29, 2017, 6 pages.

"Inactive and dual connectivity", Agenda item: 10.4.1.6.5, Source: Intel Corporation, 3GPP TSG RAN WG2 Meeting, R2-1708808, Berlin, Germany, Aug. 21-25, 2017, 3 pages.

"RRC inactive and dual connectivity coexistence", Agenda Item: 6.5.7.5, Source: Qualcomm Incorporated, SG WG2 Meeting #S2-122BIS, S2-176115, Aug. 21-25, 2017, Sophia Antipolis, France, 5 pages.

Communication Pursuant to Article 94(3) EPC issued in corresponding European Patent Application No. EP 18 917 750.4, mailed on Apr. 6, 2021, 4 pages.

First Office action issued in corresponding Canadian Application No. 3,093,484, mailed on Sep. 17, 2021, 6 pages.

First Office action issued in corresponding India Application No. 202027046147, mailed on Dec. 3, 2021, 6 pages.

First Office action issued in corresponding Chinese Application No. 202010871159.6, mailed on Jan. 21, 2022, 27 pages.

Notice of Reasons for Refusal issued in corresponding Japanese Application No. 2020-546353, mailed on Jan. 28, 2022, 10 pages.

"Discussion on the support of delta configuration during SN change procedure", Agenda Item: 31.3.1, Source: Catt, 3GPP TSG-RAN WG3#99BIS, R3-181785, SanYa, China, Apr. 16-Apr. 20, 2018, 2 pages.

"Security for Msg4", Agenda item: 10.4.1.7.6, Source: Huawei, Ran WG2 Meeting #101, R2-1802795, Athens, Greece, Feb. 26-Mar. 2, 2018, 7 pages.

"Text proposal to RRC connection control", Agenda Item: 10.4.1.3.1, Source: Ericsson, 3GPP TSG-RAN WG2 #99, R2-1707848, Berlin, Germany, Aug. 21-25, 2017, 7 pages.

Decision of Rejection issued in corresponding Chinese Application No. 202010871159.6, mailed on May 12, 2022, 27 pages.

First Office Action issued in corresponding Korean Application No. 10-2020-7025296, mailed on Apr. 28, 2022, 11 pages.

"Further Discussion on MR-DC Coexisting with Inactive State", R3-181701, Source: ZTE, 3GPP TSG RAN WG3#99bis, Sanya, China, Apr. 16-20, 2018, 3 pages.

Notice of Allowance issued in corresponding Korean application No. 10-2020-7025296, mailed Oct. 20, 2022.

Reexamination Notice issued in corresponding Chinese Application No. 202010871159.6, mailed on Nov. 2, 2022.

3GPP TS 38.423 V0.8.0 (Apr. 2018); Technical Specification Group Radio Access Network; NG-RAN; Xn application protocol (XnAP) (Release 15).

Decision of Reexamination issued in corresponding Chinese Application No. 202010871159.6, mailed on Mar. 3, 2023.

First Office Action issued in corresponding Mexican application No. MX/A/2020/009888, mailed Dec. 4, 2023.

Hearing Notice issued in corresponding Indian application No. 202027046147, mailed Dec. 18, 2023.

* cited by examiner

METHOD AND APPARATUS FOR RECOVERING RRC CONNECTION, AND COMPUTER STORAGE MEDIUM

CROSS-REFERENCE TO RELATED APPLICATIONS

The present application is a continuation of U.S. application Ser. No. 17/008,449, filed on Aug. 31, 2020, which is a is a continuation of International Application No. PCT/CN2018/085855, filed on May 7, 2018, both of which are hereby incorporated by reference in their entireties.

TECHNICAL FIELD

The present disclosure relates to the field of wireless communication technology, and in particular, to a method and apparatus for resuming a Radio Resource Control (RRC) connection, and a computer storage medium.

BACKGROUND

In order to meet people's pursuit of service speed, delay, high-speed mobility, energy efficiency, and the diversity and complexity of services in future life, the 3rd Generation Partnership Project (3GPP) International Standardization Organization began to develop 5th Generation (5G) mobile communication technology.

The main application scenarios of 5G mobile communication technology are: Enhance Mobile Broadband (eMBB), Ultra Reliable Low Latency Communication (URLLC), and massive Machine Type Communication (mMTC).

In the 5G network environment, for the purpose of reducing air interface signaling, quickly resuming wireless connections, and quickly resuming data services, a new RRC state is defined, that is, RRC inactive (RRC_INACTIVE) state. This state is different from the RRC idle (RRC_IDLE) state and the RRC connected (RRC_CONNECTED) state.

When the User Equipment (UE) is in the RRC_INACTIVE state, the network side may configure a paging area of the Radio Access Network (RAN) for the UE through dedicated signaling. The RAN paging area may be one cell or a plurality of cells. When the UE moves in the area, it does not need to notify the network side, and it follows the mobility behavior under idle, that is, the cell selection reselection principle. When the UE moves out of the paging area configured by the RAN, it will trigger the UE to resume the RRC connection and reacquire the paging area configured by the RAN. When downlink data arrives at the UE, the base station (such as gNB) that maintains the connection between the RAN and the Core Network (CN) for the UE may trigger all cells in the RAN paging area to send a paging message to the UE, to enable the UE in the INACTIVCE state to resume the RRC connection and receive data.

Therefore, there are three cases for the UE to enter the RRC connected state from the INACTIVE state.

In the first case, the downlink data arrives at the UE, and the network side initiates paging on the RAN side, impelling the UE to enter the connected state.

In the second case, the UE itself initiates RAN location area update, such as periodic RAN location update or cross-area location update.

In the third case, the UE needs to send uplink data, impelling the UE to enter the connected state.

In order to support a relatively high service rate requirement, the network side supports Dual Connectivity (DC) or Multiple Connectivity (MC). The UE in the DC/MC connection mode also needs to support the INACTIVE state. How to accurately resume the RRC connection of the UE in the INACTIVE state in the DC/MC connection mode is a problem that needs to be solved.

SUMMARY

To solve the above technical problems, the embodiments of the present disclosure provide a method and apparatus for resuming an RRC connection, and a computer storage medium.

The method for resuming an RRC connection provided by the embodiments of the present disclosure includes:
receiving, by a target base station, an RRC connection resume request message sent by a terminal;
determining, by the target base station, a first node serving the terminal according to a user equipment (UE) identifier in the RRC connection resume request message, and obtaining UE context from the first node, wherein the UE context includes first UE context on the first node side and second UE context on second node side; and
sending, by the target base station, an RRC connection resume message to the terminal, so as for the terminal to resume the RRC connection.

In an implementation manner of the present disclosure, the terminal is a terminal in a first type of RRC inactive state, and the first type of RRC inactive state refers to a state which the terminal is in after all RRC connections are suspended.

In an implementation manner of the present disclosure, the RRC connection resume request message carries first indication information, and the first indication information is used to indicate a cause for a network side to initiate an RRC connection resume.

In an implementation manner of the present disclosure, after the terminal receives a paging message sent by the first node, the target base station receives the RRC connection resume request message sent by the terminal:
wherein responsive to downlink data arriving at the second node, the second node notifies the first node to initiate paging to the terminal: responsive to the downlink data arriving at the first node, the first node initiates paging to the terminal; and the paging is used to trigger the terminal to initiate an RRC connection resume process.

In an implementation manner of the present disclosure, responsive to uplink data arriving at the terminal, the target base station receives the RRC connection resume request message sent by the terminal.

In an implementation manner of the present disclosure, the obtaining the UE context from the first node includes:
sending, by the target base station, a UE context request message to the first node, so that after receiving the UE context request message, the first node performs an integrity protection verification on the UE context request message, and obtains the second UE context on the second node side from the second node serving the terminal after the verification is passed; and
receiving, by the target base station, the first UE context on the first node side and the second UE context on the second node side sent by the first node.

In an implementation manner of the present disclosure, the RRC connection resume request message carries a first Physical Cell Identifier (PCI), and the first PCI is an identifier of a Physical secondary cell (Pscell) of the second node suggested by the terminal.

In an implementation manner of the present disclosure, the RRC connection resume request message carries second indication information, and the second indication information is used to indicate whether the first node needs to resume a resource of a Secondary Cell Group (SCG) part.

In an implementation manner of the present disclosure, the method further includes:
- after the terminal resumes the RRC connection, receiving, by the target base station, an RRC connection resume complete message sent by the terminal.

In an implementation manner of the present disclosure, the first node is a master node in a dual connection network or a multi-connection network, and the second node is a secondary node in the dual connection network or the multi-connection network.

The method for resuming an RRC connection provided by the embodiments of the present disclosure includes:
- sending, by a terminal, an RRC connection resume request message to a target base station, so that the target base station determines a first node serving the terminal according to a UE identifier in the RRC connection resume request message, and obtains UE context from the first node, wherein the UE context includes first UE context on a first node side and second UE context on a second node side; and
- receiving, by the terminal, an RRC connection resume message sent by the target base station, and then resuming the RRC connection.

In an implementation manner of the present disclosure, the terminal is a terminal in a first type of RRC inactive state, and the first type of RRC inactive state refers to a state which the terminal is in after all RRC connections are suspended.

In an implementation manner of the present disclosure, the RRC connection resume request message carries first indication information, and the first indication information is used to indicate a cause for a network side to initiate an RRC connection resume.

In an implementation manner of the present disclosure, after receiving a paging message sent by the first node, the terminal sends the RRC connection resume request message to the target base station:
- wherein responsive to downlink data arriving at the second node, the second node notifies the first node to initiate paging to the terminal: responsive to the downlink data arriving at the first node, the first node initiates paging to the terminal; and the paging is used to trigger the terminal to initiate an RRC connection resume process.

In an implementation manner of the present disclosure, when the uplink data arrives at the terminal, the terminal sends the RRC connection resume request message to the target base station.

In an implementation manner of the present disclosure, the RRC connection resume request message carries a first PCI, and the first PCI is an identifier of a Pscell of the second node suggested by the terminal.

In an implementation manner of the present disclosure, the RRC connection resume request message carries second indication information, and the second indication information is used to indicate whether the first node needs to resume a resource of a SCG part.

In an implementation manner of the present disclosure, the method further includes:
- after resuming and completing the RRC connection, sending, by the terminal, an RRC connection resume complete message to the target base station.

In an implementation manner of the present disclosure, the first node is a master node in a dual connection network or a multi-connection network, and the second node is a secondary node in the dual connection network or the multi-connection network.

The method for resuming an RRC connection provided by the embodiments of the present disclosure includes:
- after determining a target second node, sending, by a first node, SCG configuration information to the target second node, and configuring a new first calculation input parameter for calculating a key on the target second node side; and
- after obtaining a first dedicated random access channel (RACH) resource on the target second node side configured by the target second node, sending, by the first node, the first dedicated RACH resource and the first calculation input parameter to the terminal, so that the terminal initiates a random access process on the target second node side based on the first dedicated RACH resource and the first calculation input parameter.

In an implementation manner of the present disclosure, the terminal is a terminal in a second type of RRC inactive state, the second type of RRC inactive state refers to a state which the terminal is in after suspending a part of the RRC connections, and the suspending a part of the RRC connections refers to suspending a resource of a SCG part.

In an implementation manner of the present disclosure, for a case where downlink data arrives at a second node side, the method further includes:
- receiving, by the first node, a notification message sent by the second node, wherein the notification message is used to notify the first node the arrival of the downlink data at the second node side, and data bearer (DRB) identification information of a bearing corresponding to the downlink data; and
- receiving, by the first node, second UE context on the second node side sent by the second node: wherein the SCG configuration information includes at least the second UE context on the second node side.

In an implementation manner of the present disclosure, for a case where uplink data corresponding to SCG bearer arrives at the terminal, the method further includes:
- receiving, by the first node, indication information sent by the terminal, wherein the indication information is used to request the first node to initiate resume of a resource on the SCG side.

In an implementation manner of the present disclosure, the receiving, by the first node, the indication information sent by the terminal includes:
- receiving, by the first node, the indication information sent by the terminal at least through RRC signaling or a media access control control element (MAC CE).

In an implementation manner of the present disclosure, the indication information further carries set information or measurement result information of a cell on the second node side.

In an implementation manner of the present disclosure, the determining, by the first node, the target second node includes:
- determining, by the first node, the target second node based on a measurement result reported by the terminal.

In an implementation manner of the present disclosure, the sending the first dedicated RACH resource and the first calculation input parameter to the terminal includes:

sending the first dedicated RACH resource and the first calculation input parameter to the terminal through signaling or MAC CE or PDCCH order.

In an implementation manner of the present disclosure, when the first node obtains the first dedicated RACH resource on the target second node side configured by the target second node, the first node also obtains system broadcast information on the target second node side configured by the target second node.

In an implementation manner of the present disclosure, the method further includes:

sending, by the first node, the system broadcast information on the target second node side to the terminal through RRC signaling.

In an implementation manner of the present disclosure, when the target second node does not configure system broadcast information on the target second node side, and the target second node is not the second node, the terminal needs to read the system broadcast information first, and then trigger the random access process on the target second node side.

In an implementation manner of the present disclosure, the first node is a master node in a dual connection network or a multi-connection network, the second node is a source secondary node in the dual connection network or the multi-connection network, and the target second node is a target secondary node in the dual connection network or the multi-connection network.

The apparatus for resuming an RRC connection provided by the embodiments of the present disclosure includes:

a first receiving unit, configured to receive an RRC connection resume request message sent by a terminal:

a UE context obtaining unit, configured to determine a first node serving the terminal according to a UE identifier in the RRC connection resume request message, and obtain UE context from the first node, wherein the UE context includes first UE context on the first node side and second UE context on second node side; and a sending unit, configured to send an RRC connection resume message to the terminal, so as for the terminal to resume the RRC connection.

In an implementation manner of the present disclosure, the terminal is a terminal in a first type of RRC inactive state, and the first type of RRC inactive state refers to a state which the terminal is in after all RRC connections are suspended.

In an implementation manner of the present disclosure, the RRC connection resume request message carries first indication information, and the first indication information is used to indicate a cause for a network side to initiate an RRC connection resume.

In an implementation manner of the present disclosure, after the terminal receives a paging message sent by the first node, the first receiving unit receives the RRC connection resume request message sent by the terminal:

wherein responsive to downlink data arriving at the second node, the second node notifies the first node to initiate paging to the terminal: responsive to the downlink data arriving at the first node, the first node initiates paging to the terminal; and the paging is used to trigger the terminal to initiate an RRC connection resume process.

In an implementation manner of the present disclosure, responsive to uplink data arriving at the terminal, the first receiving unit receives the RRC connection resume request message sent by the terminal.

In an implementation manner of the present disclosure, the UE context obtaining unit is configured to: send a UE context request message to the first node, so that after receiving the UE context request message, the first node performs an integrity protection verification on the UE context request message, and obtains the second UE context on the second node side from the second node serving the terminal after the verification is passed:

and receive the first UE context on the first node side and the second UE context on the second node side sent by the first node.

In an implementation manner of the present disclosure, the RRC connection resume request message carries a first PCI, and the first PCI is an identifier of a Pscell of the second node suggested by the terminal.

In an implementation manner of the present disclosure, the RRC connection resume request message carries second indication information, and the second indication information is used to indicate whether the first node needs to resume a resource of a SCG part.

In an implementation manner of the present disclosure, the apparatus further includes:

a second receiving unit, configured to, after the terminal resumes the RRC connection, receive an RRC connection resume complete message sent by the terminal.

In an implementation manner of the present disclosure, the first node is a master node in a dual connection network or a multi-connection network, and the second node is a secondary node in the dual connection network or the multi-connection network.

The apparatus for resuming an RRC connection provided by the embodiments of the present disclosure includes:

a first sending unit, configured to send an RRC connection resume request message to a target base station, so that the target base station determines a first node serving the terminal according to a UE identifier in the RRC connection resume request message, and obtains UE context from the first node, wherein the UE context includes first UE context on a first node side and second UE context on a second node side:

a receiving unit, configured to receive an RRC connection resume message sent by the target base station; and a resume unit, configured to resume the RRC connection.

In an implementation manner of the present disclosure, the terminal is a terminal in a first type of RRC inactive state, and the first type of RRC inactive state refers to a state which the terminal is in after all RRC connections are suspended.

In an implementation manner of the present disclosure, the RRC connection resume request message carries first indication information, and the first indication information is used to indicate a cause for a network side to initiate an RRC connection resume.

In an implementation manner of the present disclosure, after the terminal receives a paging message sent by the first node, the first sending unit sends the RRC connection resume request message to the target base station:

wherein responsive to downlink data arriving at the second node, the second node notifies the first node to initiate paging to the terminal: responsive to the downlink data arriving at the first node, the first node initiates paging to the terminal; and the paging is used to trigger the terminal to initiate an RRC connection resume process.

In an implementation manner of the present disclosure, responsive to uplink data arriving at the terminal, the first sending unit sends the RRC connection resume request message to the target base station.

In an implementation manner of the present disclosure, the RRC connection resume request message carries a first PCI, and the first PCI is an identifier of a Pscell of the second node suggested by the terminal.

In an implementation manner of the present disclosure, the RRC connection resume request message carries second indication information, and the second indication information is used to indicate whether the first node needs to resume a resource of a SCG part.

In an implementation manner of the present disclosure, the apparatus further includes:
a second sending unit, configured to, after resume of the RRC connection is completed, send an RRC connection resume complete message to the target base station.

In an implementation manner of the present disclosure, the first node is a master node in a dual connection network or a multi-connection network, and the second node is a secondary node in the dual connection network or the multi-connection network.

The apparatus for resuming an RRC connection provided by the embodiments of the present disclosure includes:
a determining unit, configured to determine a target second node:
a first sending unit, configured to send SCG configuration information to the target second node:
a configuration unit, configured to configure a new first calculation input parameter for calculating a key on the target second node side:
an obtaining unit, configured to obtain a first dedicated RACH resource on the target second node side configured by the target second node; and
a second sending unit, configured to send the first dedicated RACH resource and the first calculation input parameter to the terminal, so that the terminal initiates a random access process on the target second node side based on the first dedicated RACH resource and the first calculation input parameter.

In an implementation manner of the present disclosure, the terminal is a terminal in a second RRC inactive state, and the second RRC inactive state refers to a state which the terminal is in after suspending part of the RRC connection, and the suspending part of the RRC connection refers to suspending a resource of a SCG part.

In an implementation manner of the present disclosure, for a case where downlink data arrives at a second node side, the apparatus further includes:
a first receiving unit, configured to receive a notification message sent by the second node, wherein the notification message is used to notify the first node arrival of downlink data at the second node side, and DRB identification information of a bearing corresponding to the downlink data; and receive second UE context on the second node side sent by the second node: wherein the SCG configuration information includes at least the second UE context on the second node side.

In an implementation manner of the present disclosure, for a case where uplink data corresponding to SCG bearer arrives at the terminal, the apparatus further includes:
a second receiving unit, configured to receive indication information sent by the terminal, wherein the indication information is used to request the first node to initiate resume of a resource on the SCG side.

In an implementation manner of the present disclosure, the second receiving unit is configured to receive the indication information sent by the terminal at least through RRC signaling or MAC CE.

In an implementation manner of the present disclosure, the indication information further carries set information or measurement result information of a cell on the second node side.

In an implementation manner of the present disclosure, the determining unit is configured to determine the target second node based on a measurement result reported by the terminal.

In an implementation manner of the present disclosure, the second sending unit is configured to send the first dedicated RACH resource and the first calculation input parameter to the terminal through signaling or MAC CE or PDCCH order.

In an implementation manner of the present disclosure, when obtaining the first dedicated RACH resource on the target second node side configured by the target second node, the obtaining unit further obtains system broadcast information on the target second node side configured by the target second node.

In an implementation manner of the present disclosure, the apparatus further includes:
a third sending unit, configured to send the system broadcast information on the target second node side to the terminal through RRC signaling.

In an implementation manner of the present disclosure, when the target second node does not configure system broadcast information on the target second node side, and the target second node is not the second node, the terminal needs to read the system broadcast information first, and then trigger the random access process on the target second node side.

In an implementation manner of the present disclosure, the first node is a master node in a dual connection network or a multi-connection network, the second node is a source secondary node in the dual connection network or the multi-connection network, and the target second node is a target secondary node in the dual connection network or the multi-connection network.

The computer storage medium provided by the embodiments of the present disclosure stores computer-executable instructions, which when executed by a processor implements the above method for resuming an RRC connection.

In the technical solutions of the embodiments of the present disclosure, 1) the target base station receives the RRC connection resume request message sent by the terminal: the target base station determines the first node serving the terminal according to the UE identifier in the RRC connection resume request message, and obtains the UE context from the first node, where the UE context includes first UE context on the first node side and second UE context on the second node side: the target base station sends an RRC connection resume message to the terminal to enable the terminal to resume the RRC connection. 2) After determining the target second node, the first node sends the SCG configuration information to the target second node, and configures a new first calculation input parameter for calculating the key on the target second node side: after acquiring the first dedicated RACH resource on the target second node side configured by the target second node, the first node sends the first dedicated RACH resource and the first calculation input parameter to the terminal, so that the terminal initiates a random access process on the target second node side based on the first dedicated RACH resource and the first calculation input parameter. By adopting the technical solutions of the embodiments of the present disclosure, the UE is supported to enter the complete RRC INACTIVE state (called the first RRC inactive state in the embodiments of the present disclosure) and partial RRC INACTIVE state (called the second RRC inactive state in the embodiments of the present disclosure), which realizes the RRC connection resume process in the two RRC inactive states. In addition, it realizes the purpose of the UE assisting the network side to quickly and accurately select the SN.

BRIEF DESCRIPTION OF THE DRAWINGS

The drawings described herein are used to provide a further understanding of the present disclosure and constitute a part of the present disclosure. The schematic embodiments of the present disclosure and their descriptions are used to explain the present disclosure and do not constitute an undue limitation on the present disclosure. In the drawings.

DETAILED DESCRIPTION

In order to understand the features and technical contents of the embodiments of the present disclosure in more detail, the following describes the implementation of the embodiments of the present disclosure in detail with reference to the accompanying drawings. The accompanying drawings are for reference only and are not intended to limit the embodiments of the present disclosure.

The technical solutions of the embodiments of the present disclosure are mainly applied to 5G mobile communication systems. The technical solutions of the embodiments of the present disclosure are not limited to 5G mobile communication systems, but can also be applied to other types of mobile communication systems. The following describes the main application scenarios in the 5G mobile communication system:

1) eMBB scenario: eMBB aims at obtaining multimedia content, services and data by the users, and its business demand is growing very rapidly. Since eMBB may be deployed in different scenarios, such as indoors, urban areas, and rural areas, the differences in business capabilities and requirements are also relatively large, so the business should be analyzed in conjunction with specific deployment scenarios.

2) URLLC scenario: the typical applications of URLLC include: industrial automation, power automation, telemedicine operation, traffic safety guarantee, etc.

3) mMTC scenario: the typical characteristics of URLLC include: high connection density, small data volume, delay-insensitive services, low cost and long service life of modules, etc.

The following describes the three RRC states in the 5G network environment:

1) RRC_IDLE state: mobility is UE-based cell selection reselection, paging is initiated by CN, and a paging area is configured by CN. There is no UE AS context on the base station side. There is no RRC connection.

2) RRC_CONNECTED state: there is an RRC connection, and there is UE AS context in the base station and the UE. The network side knows that the location of the UE is at a specific cell level. The mobility is the mobility controlled by the network side. Unicast data can be transmitted between the UE and the base station.

3) RRC_INACTIVE state: the mobility is UE-based cell selection reselection, there is a connection between CN and RAN, UE AS context exists on a certain base station, paging is triggered by RAN, RAN-based paging area is managed by RAN, and the network side knows that the location of the UE is based on the paging area level of the RAN.

Figure 1:
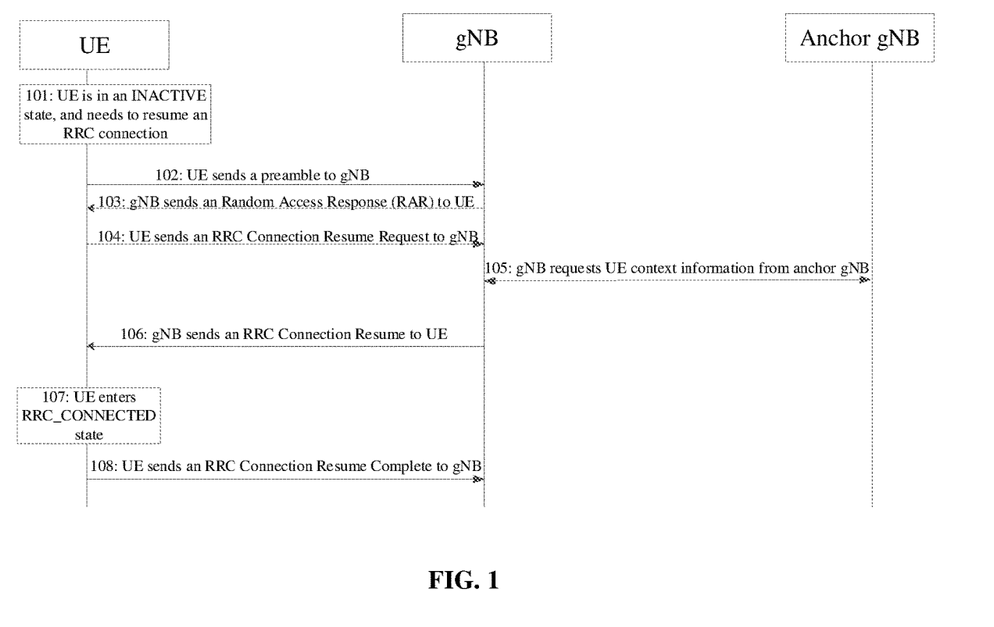
FIG. 1 is a schematic diagram of an RRC connection resume process.

FIG. 1 is a schematic diagram of the RRC connection resume process. As shown in FIG. 1, the RRC connection resume process includes the following processes.

In step 101: the UE is in the INACTIVE state, and the RRC connection is to be resumed.

In step 102: the UE sends a preamble to gNB.

In step 103: the gNB sends a Random Access Response (RAR) to the UE.

In step 104: the UE sends an RRC Connection Resume Request to the gNB.

In step 105: the gNB requests UE context information from an anchor gNB.

In step 106: the gNB sends an RRC connection resume message (RRC Connection Resume) to the UE.

In step 107: the UE enters the RRC_CONNECTED state.

In step 108: the UE sends an RRC connection resume complete message (RRC Connection Resume Complete) to the gNB.

The technical solutions of the embodiments of the present disclosure define two new concepts of complete RRC connection suspension and partial RRC connection suspension, and enable the network side and the UE side to support the INACTIVE state. It is worth noting that the complete RRC connection suspension refers to the suspension of all RRC connections, the partial RRC connection suspension refers to the suspension of part of the RRC connections, and further, the suspension of part of the RRC connections refers to the suspension of a resource of the SCG part. Correspondingly, after completing the suspension of all RRC connections, the UE enters the complete RRC INACTIVE state (also called the first INACTIVE state), and after completing the suspension of part of the RRC connections, the UE enters the partial RRC INACTIVE state (also called the second INACTIVE state).

Figure 2:
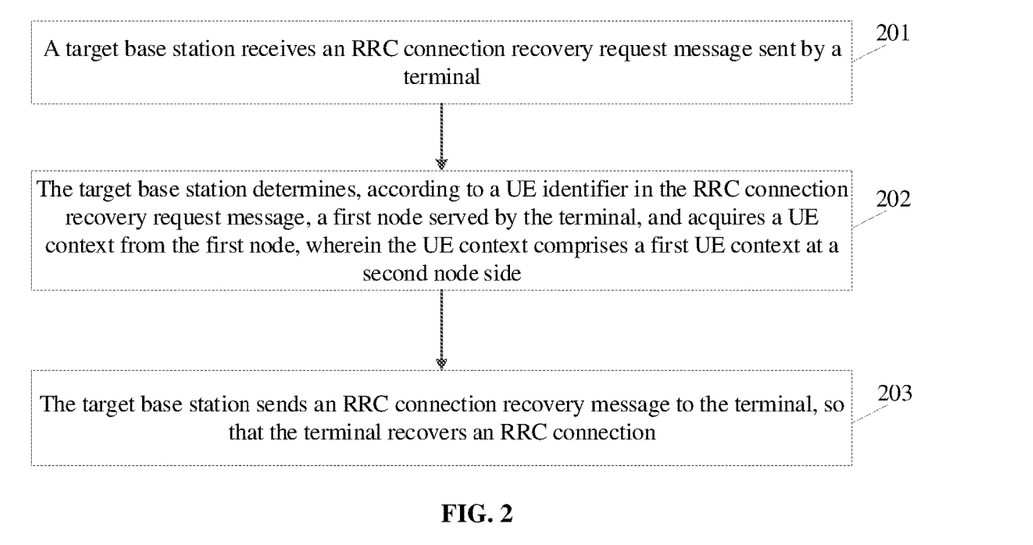
FIG. 2 is a first schematic flowchart of a method for resuming an RRC connection according to an embodiment of the present disclosure.

FIG. 2 is a first schematic flowchart of a method for resuming an RRC connection according to an embodiment of the present disclosure. As shown in FIG. 2, the method for resuming an RRC connection includes the following steps.

In step 201: the target base station receives an RRC connection resume request message sent by the terminal.

In the embodiment of the present disclosure, the terminal is a terminal in a first type of RRC inactive state (that is, the complete RRC INACTIVE state), and the first type of RRC inactive state refers to a state which the terminal is in after all RRC connections are suspended.

In the embodiment of the present disclosure, the first node is a master node in a dual connection network or a multi-connection network, and the second node is a secondary node in the dual connection network or the multi-connection network.

In the embodiment of the present disclosure, the triggering of the RRC connection resume process initiated by the terminal may be performed in the following manners.

First manner: after the terminal receives the paging message sent by the first node, the target base station receives the RRC connection resume request message sent by the terminal: where if the downlink data reaches the second node, the second node notifies the first node to initiate paging to the terminal: if the downlink data reaches the first node, the first node initiates paging to the terminal; and the paging is used to trigger the terminal to initiate the RRC connection resume process.

Second manner: if the uplink data reaches the terminal, the target base station receives the RRC connection resume request message sent by the terminal.

In an embodiment, the RRC connection resume request message carries first indication information, and the first indication information is used to indicate a cause for the network side to initiate the RRC connection resume.

In order to assist the target base station to accurately and quickly determine the second node, in one embodiment, the RRC connection resume request message carries the first PCI, and the first PCI is an identifier of the Pscell of the second node suggested by the terminal. In another embodiment, the RRC connection resume request message carries second indication information, and the second indication information is used to determine whether the first node needs to resume the resource of the SCG part.

In step 202: the target base station determines the first node serving the terminal according to the UE identifier in the RRC connection resume request message, and obtains the UE context from the first node, where the UE context includes first UE context on the first node side and second UE context on the second node side.

In the embodiment of the present disclosure, the obtaining the UE context from the first node includes:

sending, by the target base station, a UE context request message to the first node, so that after receiving the UE context request message, the first node performs integrity protection verification on the UE context request message, and after the verification is past, obtains the second UE context on the second node side from the second node serving the terminal:

receiving, by the target base station, the first UE context on the first node side and the second UE context on the second node side sent by the first node.

In step 203: the target base station sends an RRC connection resume message to the terminal, so as for the terminal to resume the RRC connection.

In the embodiment of the present disclosure, after the terminal resumes the RRC connection, the target base station receives the RRC connection resume complete message sent by the terminal.

The following describes the resume process of the UE in the complete RRC INACTIVE state of the embodiment of the present disclosure with reference to specific application examples. In the following embodiments, the SN is the second node and the MN is the first node.

1) If the downlink data reaches the SN side, the SN notifies the MN to initiate the paging process for the target UE: if the downlink data reaches the MN side, the MN initiates the paging process for the target UE; and the paging triggers the UE to initiate the RRC connection resume process. If the uplink data reaches the UE side, the UE initiates the RRC connection resume process.

2) The UE initiates an RRC connection resume request message (MSG3) to the target base station. Optionally, MSG3 may carry an indication indicating the cause for the network side to initiate RRC resume, such as signaling cause, uplink data arrival, and DRB id information of arrival of the uplink data. The target base station addresses the serving MN node according to the UE identifier in MSG3, and sends a process requesting the UE context request to the serving MN node. After receiving the request, the MN first performs the integrity protection verification for MSG3, and after verification passes, requests the serving SN node the UE context on the SN side, and sends both the UE context on the MN and SN sides to the target base station.

3) In order to assist the target base station to accurately and quickly determine the SN node:

first manner: the UE carries one PCI in MSG3, and the PCI is the Pscell of the SN node recommended by the UE.

second manner: the UE carries one indication in MSG3, and the indication is used to indicate whether the MN needs to resume the bearer and resource of the SCG part.

4) The target base station sends an RRC connection resume message (MSG4) to the UE to resume the RRC connection. At the same time, the MN sends a new key S-KgNB to the new SN node.

5) After the UE resumes the RRC connection, it sends an RRC connection resume complete message.

Figure 3:
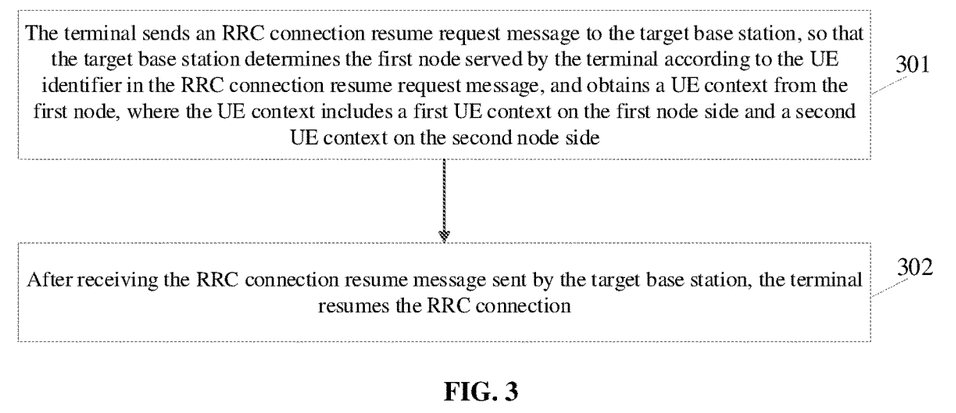
FIG. 3 is a second schematic flowchart of a method for resuming an RRC connection according to an embodiment of the present disclosure.

FIG. 3 is a second schematic flowchart of a method for resuming an RRC connection according to an embodiment of the present disclosure. As shown in FIG. 3, the method for resuming an RRC connection includes the following steps.

In step 301: the terminal sends an RRC connection resume request message to the target base station, so that the target base station determines the first node serving the terminal according to the UE identifier in the RRC connection resume request message, and obtains a UE context from the first node, where the UE context includes a first UE context on the first node side and a second UE context on the second node side.

In the embodiment of the present disclosure, the terminal is a terminal in a first RRC inactive state (that is, a complete RRC INACTIVE state), and the first RRC inactive state refers to a state of the terminal after all RRC connections are suspended.

In the embodiment of the present disclosure, the first node is a master node in a dual connection network or a multi-connection network, and the second node is a secondary node in a dual connection network or a multi-connection network.

In the embodiment of the present disclosure, the triggering of the RRC connection resume process initiated by the terminal may be performed in the following manners.

First manner: after receiving the paging message sent by the first node, the terminal sends an RRC connection resume request message to the target base station; where if the downlink data reaches the second node, the second node notifies the first node to initiate paging to the terminal: if downlink data reaches the first node, the first node initiates paging to the terminal; and the paging is used to trigger the terminal to initiate RRC connection resume process.

Second manner: if the uplink data reaches the terminal, the terminal sends an RRC connection resume request message to the target base station.

In an embodiment, the RRC connection resume request message carries first indication information, and the first indication information is used to indicate a cause for the network side to initiate the RRC connection resume.

In order to assist the target base station to accurately and quickly determine the second node, in one embodiment, the RRC connection resume request message carries the first PCI, and the first PCI is an identifier of the Pscell of the second node suggested by the terminal. In another embodiment, the RRC connection resume request message carries second indication information, and the second indication information is used to determine whether the first node needs to resume the resource of the SCG part.

In step 302: after receiving the RRC connection resume message sent by the target base station, the terminal resumes the RRC connection.

In the embodiment of the present disclosure, after the terminal resumes the RRC connection, it sends an RRC connection resume complete message to the target base station.

Figure 4:
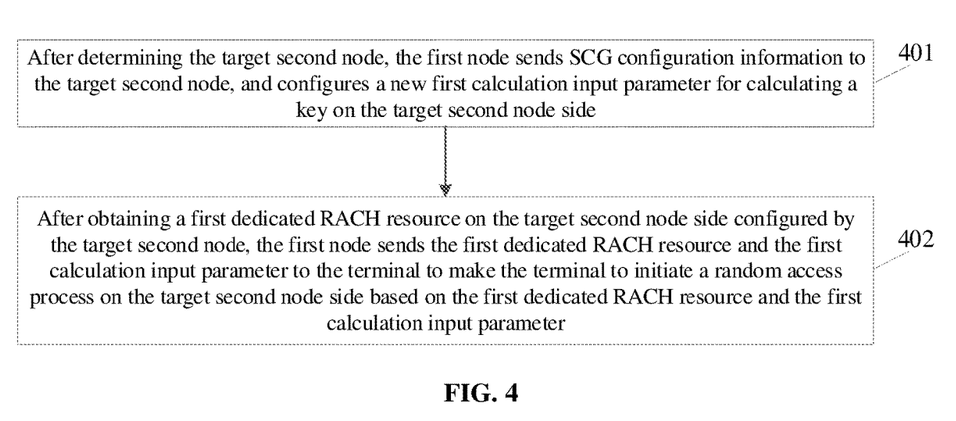
FIG. 4 is a third schematic flowchart of a method for resuming an RRC connection according to an embodiment of the present disclosure.

FIG. 4 is a third schematic flowchart of a method for resuming an RRC connection according to an embodiment of the present disclosure. As shown in FIG. 4, the method for resuming an RRC connection includes the following steps.

In step 401: after determining the target second node, the first node sends SCG configuration information to the target second node, and configures a new first calculation input parameter for calculating a key on the target second node side.

In the embodiment of the present disclosure, the terminal is a terminal in a second RRC inactive state (that is, a partial RRC INACTIVE state). The second RRC inactive state refers to a state which the terminal is in after part of the RRC connections is suspended, and the suspension of part of the RRC connections refers to suspending the resource of the SCG part.

In the following embodiments of the present disclosure, the first node is a master node in a dual connection network or a multi-connection network, the second node is a source auxiliary node in a dual connection network or a multi-connection network, and the target second node is a target secondary node in a dual-connection network or a multi-connection network.

The solutions of the embodiments of the present disclosure may be divided into the following two scenarios.

First scenario: when the downlink data reaches the second node side.

The first node receives a notification message sent by the second node, where the notification message is used to notify the first node that the downlink data reaches the second node side, and the DRB identification information of a bearer corresponding to the downlink data: the first node receives the second UE context on the second node side sent by the second node: where the SCG configuration information includes at least the second UE context on the second node side.

Second scenario: when the uplink data corresponding to the SCG bearer reaches the terminal.

The first node receives indication information sent by the terminal, and the indication information is used to request the first node to initiate resume of resources on the SCG side.

Further, the first node receives the indication information sent by the terminal at least through RRC signaling or MAC CE.

In an embodiment, the indication information also carries set information or measurement result information of cells on the second node side.

In the embodiment of the present disclosure, the first node determines the target second node based on the measurement result reported by the terminal.

In step 402: after acquiring the first dedicated RACH resource on the target second node side configured by the target second node, the first node sends the first dedicated RACH resource and the first calculation input parameter to the terminal to make the terminal to initiate a random access process on the target second node side based on the first dedicated RACH resource and the first calculation input parameter.

In the embodiment of the present disclosure, the first node sends the first dedicated RACH resource and the first calculation input parameter to the terminal through signaling or MAC CE or PDCCH order.

In an embodiment, when the first node obtains the first dedicated RACH resource on the target second node side configured by the target second node, it also obtains the system broadcast information on the target second node side configured by the target second.

Based on this, the first node sends the system broadcast information on the target second node side to the terminal through RRC signaling.

Here, if the target second node does not configure the system broadcast information on the target second node side, and the target second node is not the second node, the terminal needs to read the system broadcast information first, and then trigger the random access process on the target second node side.

The following describes the resume process of the UE in partial RRC INACTIVE state according to specific application examples. In the following embodiments, the SN is the second node, the MN is the first node, and the target SN is the target second node.

First scenario: downlink data reaches the SN side.

1) The SN notifies the MN side that the downlink data arrives at the SN side, and notifies the DRB ID information of the bearer at which the data arrives. At the same time, the SN may forward the UE context information of the UE on the SN side to the MN.

2) The MN side decides the target SN according to the measurement report result of the UE. The MN may send the SCG configuration information to the target SN. At the same time, the MN configures a new input parameter counter for calculating the key on the target SN side to the target SN.

3) The target SN simultaneously configures the system broadcast information of the cell on the target SN side, and configures the dedicated RACH resource on the Pscell to the MN for the MN to configure the UE for the random access process on the target SN side. If the target SN does not configure the system broadcast information, and the target SN is not the original SN, the UE needs to firstly read the system broadcast information and then trigger the random access process on the target SN side.

4) The MN issues signaling or MAC CE or PDCCH order to configure the dedicated RACH resource for the random access process on the target SN side and the input parameter counter for key calculation on the target SN side of the UE. The MN configures the system broadcast information of the target SN to the UE through RRC signaling. If the system broadcast information is not configured, the UE needs to firstlys read the system broadcast information and then trigger the random access process on the target SN side.

5) The UE initiates a random access procedure on the target SN side to resume the SCG side resource and SRB3.

Second scenario: the uplink data corresponding to SCG bearer arrives at the UE.

1) The UE sends an instruction to the MN side to initiate a request for resource resume on the SCG side. This instruction may be carried in RRC signaling, or MAC CE or other signals. The message may also carry optional set information or measurement result information of the cells on the SN side to the MN side.

2) The MN side decides the target SN according to the report result of the UE. The MN may send the SCG configuration information to the target SN. At the same time, the MN configures a new input parameter counter for calculating the key on the target SN side to the target SN.

3) The target SN simultaneously configures the system broadcast information of the cell on the target SN side, and configures the dedicated RACH resource on the Pscell to the MN for the MN to configure the UE for the random access process on the target SN side. If the target SN does not configure the system broadcast information, and the target SN is not the original SN, the UE needs to firstly read the system broadcast information and then trigger the random access process on the target side.

4) The MN issues signaling or MAC CE or PDCCH order to configure the UE's dedicated RACH resource for the random access process on the target SN side and the input parameter counter for key calculation on the target SN side. The MN configures the system broadcast information of the target SN to the UE through RRC signaling. If the system broadcast information is not configured, the UE needs to firstly read the system broadcast information and then trigger the random access process on the target side.

5) The UE initiates a random access procedure on the target SN side to resume the SCG side resources and SRB3.

Figure 5:
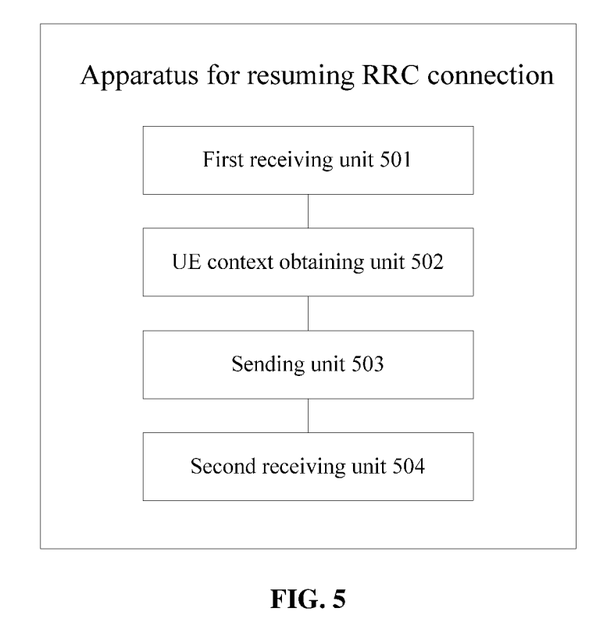
FIG. 5 is a first schematic structural diagram of an apparatus for resuming an RRC connection according to an embodiment of the present disclosure.

FIG. 5 is a first schematic structural diagram of an apparatus for resuming an RRC connection according to an embodiment of the present disclosure. As shown in FIG. 5, the apparatus for resuming an RRC connection includes:

a first receiving unit 501, configured to receive an RRC connection resume request message sent by the terminal:

a UE context obtaining unit 502, configured to determine a first node serving the terminal according to a UE identifier in the RRC connection resume request message, and obtain UE context from the first node, where the UE context includes first UE context on the first node side and second UE context on a second node side; and a sending unit 503, configured to send an RRC connection resume message to the terminal, so as for the terminal to resume the RRC connection.

In an embodiment, the terminal is a terminal in a first type of RRC inactive state, and the first type of RRC inactive state refers to a state which the terminal is in after all RRC connections are suspended.

In an embodiment, the RRC connection resume request message carries first indication information, and the first indication information is used to indicate a cause for the network side to initiate RRC connection resume.

In an embodiment, after the terminal receives the paging message sent by the first node, the first receiving unit 501 receives the RRC connection resume request message sent by the terminal:

where if the downlink data reaches the second node, the second node notifies the first node to initiate paging to the terminal: if the downlink data reaches the first node, the first node initiates paging to the terminal; and the paging is used to trigger the terminal to initiate an RRC connection resume process.

In an embodiment, if the uplink data arrives at the terminal, the first receiving unit 501 receives the RRC connection resume request message sent by the terminal.

In an embodiment, the UE context obtaining unit 502 is configured to send a UE context request message to the first node, so that the first node receives the UE context request message and verifies the integrity protection of the UE context request message, and after the verification is passed, obtains the second UE context on the second node side from the second node serving the terminal; and receive the first UE context on the first node side and the second UE context on the second node side sent by the first node.

In an embodiment, the RRC connection resume request message carries a first PCI, and the first PCI is the identifier of the Pscell of the second node suggested by the terminal.

In an embodiment, the RRC connection resume request message carries second indication information, and the second indication information is used to determine whether the first node needs to resume the resource of the SCG part.

In an embodiment, the apparatus further includes:

a second receiving unit 504, configured to receive an RRC connection resume complete message sent by the terminal after the terminal resumes the RRC connection.

In an embodiment, the first node is a master node in a dual connection network or a multi-connection network, and the second node is a secondary node in a dual connection network or a multi-connection network.

Those skilled in the art should understand that the functions implemented by the units in the apparatus for resuming RRC connection shown in FIG. 5 can be understood by referring to the related description of the foregoing method for resuming RRC connection. The function of each unit in the apparatus for resuming RRC connection shown in FIG. 5 may be implemented by a program running on a processor, or may be implemented by a specific logic circuit.

Figure 6:
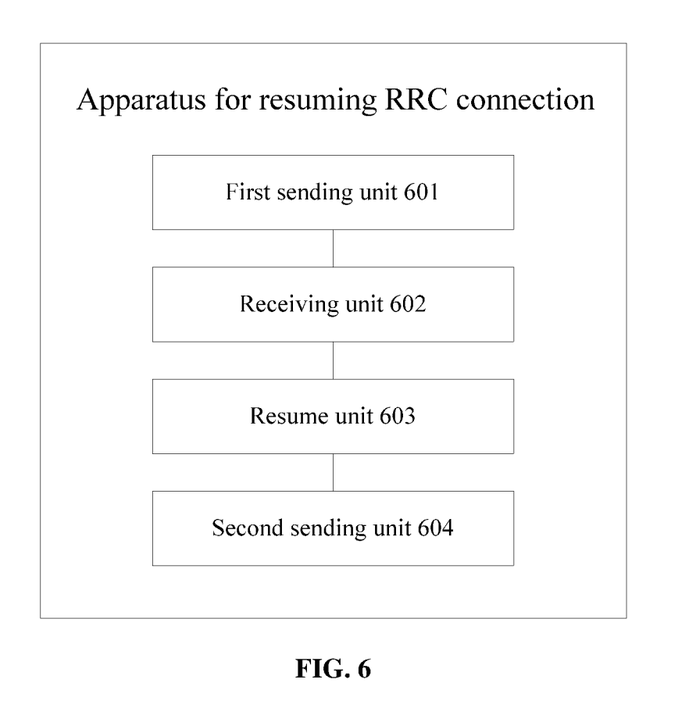
FIG. 6 is a second schematic structural diagram of an apparatus for resuming an RRC connection according to an embodiment of the present disclosure.

FIG. 6 is a second structural composition diagram of an apparatus for resuming an RRC connection according to an embodiment of the present disclosure. As shown in FIG. 6, the apparatus for resuming an RRC connection includes:

a first sending unit 601, configured to send an RRC connection resume request message to the target base station, so that the target base station determines the first node serving the terminal according to a UE identifier in the RRC connection resume request message, and obtains a UE context from the first node, where the UE context includes a first UE context on the first node side and a second UE context on the second node side:

a receiving unit 602, configured to receive an RRC connection resume message sent by the target base station; and a resume unit 603, configured to resume the RRC connection.

In an embodiment, the terminal is a terminal in a first type of RRC inactive state, and the first type of RRC inactive state refers to a state of the terminal after all RRC connections are suspended.

In an embodiment, the RRC connection resume request message carries first indication information, and the first indication information is used to indicate a cause for the network side to initiate RRC connection resume.

In an embodiment, after the terminal receives the paging message sent by the first node, the first sending unit 601 sends an RRC connection resume request message to the target base station:
where if the downlink data reaches the second node, the second node notifies the first node to initiate paging to the terminal: if the downlink data reaches the first node, the first node initiates paging to the terminal; and the paging is used to trigger the terminal to initiate an RRC connection resume process.

In an embodiment, if the uplink data reaches the terminal, the first sending unit 601 sends an RRC connection resume request message to the target base station.

In an embodiment, the RRC connection resume request message carries a first PCI, and the first PCI is the identifier of the Pscell of the second node suggested by the terminal.

In an embodiment, the RRC connection resume request message carries second indication information, and the second indication information is used to determine whether the first node needs to resume the resource of the SCG part.

In an embodiment, the apparatus further includes:
a second sending unit 604, configured to send an RRC connection resume complete message to the target base station after resume of the RRC connection is completed.

In an embodiment, the first node is a master node in a dual connection network or a multi-connection network, and the second node is a secondary node in a dual connection network or a multi-connection network.

Those skilled in the art should understand that the implementation function of each unit in the apparatus for resuming RRC connection shown in FIG. 6 can be understood by referring to the foregoing related description of the method for resuming RRC connection. The function of each unit in the apparatus for resuming RRC connection shown in FIG. 6 may be realized by a program running on a processor, or may be realized by a specific logic circuit.

Figure 7:
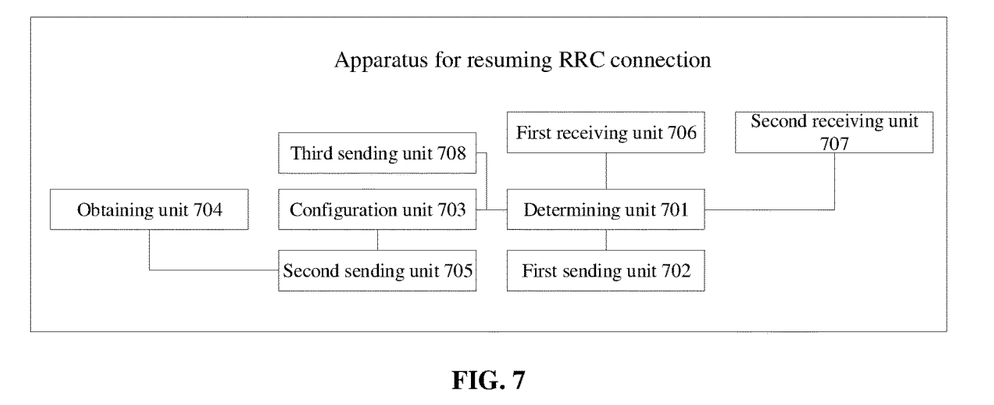
FIG. 7 is a third schematic structural diagram of an apparatus for resuming an RRC connection according to an embodiment of the present disclosure.

FIG. 7 is a third schematic structural diagram of an apparatus for resuming an RRC connection according to an embodiment of the present disclosure. As shown in FIG. 7, the apparatus for resuming an RRC connection includes:
a determining unit 701, configured to determine the target second node:
a first sending unit 702, configured to send SCG configuration information to the target second node:
a configuration unit 703, configured to configure a new first calculation input parameter for calculating a key on the target second node side:
an obtaining unit 704, configured to obtain a first dedicated RACH resource on the target second node side configured by the target second node; and
a second sending unit 705, configured to send the first dedicated RACH resource and the first calculation input parameter to the terminal, so that the terminal initiates a random access process on the target second node side based on the first dedicated RACH resource and the first calculation input parameter.

In an embodiment, the terminal is a terminal in a second RRC inactive state. The second RRC inactive state refers to a state of the terminal after part of the RRC connections is suspended. The suspension of part of the RRC connections refers to suspending the resource of the SCG part.

In an embodiment, for the case where the downlink data reaches the second node side, the apparatus further includes:
a first receiving unit 706, configured to receive a notification message sent by the second node, where the notification message is used to notify the first node that downlink data has reached the second node side, and the DRB identifier information of a bearer corresponding to the downlink data: receive the second UE context on the second node side sent by the second node: where the SCG configuration information includes at least the second UE context on the second node side.

In an embodiment, for the case where uplink data corresponding to the SCG bearer arrives at to the terminal, the apparatus further includes:
a second receiving unit 707, configured to receive indication information sent by the terminal, and the indication information is used to request the first node to initiate resume of resource on the SCG side.

In an embodiment, the second receiving unit 707 is configured to receive the indication information sent by the terminal at least through RRC signaling or MAC CE.

In an embodiment, the indication information also carries set information or measurement result information of the cell on the second node side.

In an embodiment, the determining unit 701 is configured to determine the target second node based on the measurement result reported by the terminal.

In an embodiment, the second sending unit 705 is configured to send the first dedicated RACH resource and the first calculation input parameter to the terminal through signaling or MAC CE or PDCCH order.

In an embodiment, when the obtaining unit 704 obtains the first dedicated RACH resource on the target second node side configured by the target second node, it also obtains the system broadcasts information on the target second node side configured by the target second node.

In an embodiment, the apparatus further includes:
a third sending unit 708, configured to send the system broadcast information on the target second node side to the terminal through RRC signaling.

In an embodiment, if the target second node does not configure system broadcast information on the target second node side, and the target second node is not the second node, the terminal needs to read the system broadcast information first, and then trigger the random access process on the target second node side.

In an embodiment, the first node is a master node in a dual connection network or a multi-connection network, the second node is a source secondary node in a dual connection network or a multi-connection network, and the target second node is a target secondary node in a dual-connected network or multi-connected network.

Those skilled in the art should understand that the implementation function of each unit in the apparatus for resuming RRC connection shown in FIG. 7 can be understood by referring to the related description of the foregoing method for resuming RRC connection. The function of each unit in the apparatus for resuming RRC connection shown in FIG. 7 may be implemented by a program running on a processor, or may be implemented by a specific logic circuit.

The above apparatus for resuming RRC connection according to the embodiments of the present disclosure may also be stored in a computer-readable storage medium if being implemented in the form of a software function module and sold or used as an independent product. Based on such understanding, the essence of the technical solutions of the embodiments of the present disclosure, or the part contributing to the prior art, may be embodied in the form of a software product which is stored in a storage medium including a number of instructions such that a computer device (which may be a personal computer, a server, or a network device, etc.) performs all or part of the method described in each of the embodiments of the present disclosure. The foregoing storage medium includes: any medium that is capable of storing program codes, such as a USB disk, a mobile hard disk drive, a Read Only Memory (ROM), a magnetic disk or an optical disc, etc. In this way, the embodiments of the present disclosure are not limited to any particular combination of hardware and software.

Accordingly, the embodiments of the present disclosure further provide a computer storage medium storing a computer-executable instruction which, when being executed by a processor, implements the above-mentioned method for resuming RRC connection according to the embodiments of the present disclosure.

Figure 8:
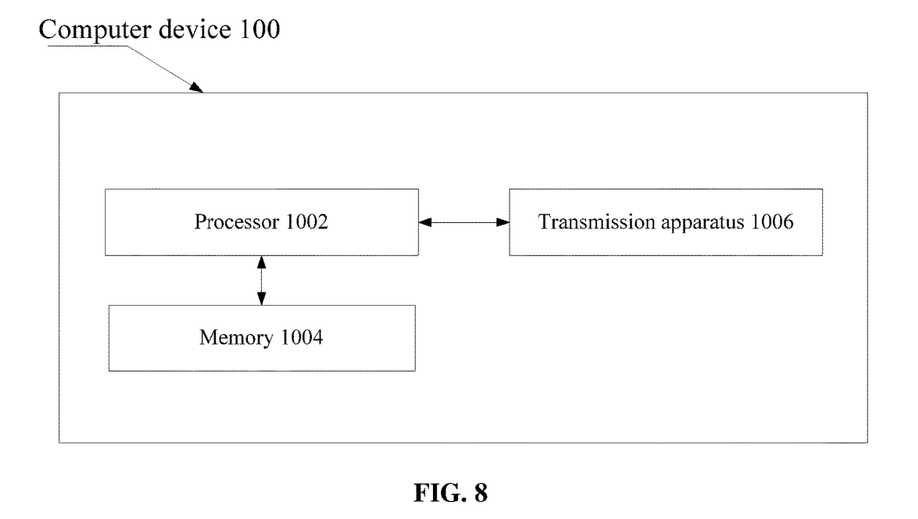
FIG. 8 is a schematic structural diagram of a computer device according to an embodiment of the present disclosure.

FIG. 8 is a schematic diagram of a structural composition of a computer device according to an embodiment of the present disclosure. The computer device according to the embodiment of the present disclosure may either be a terminal, or a network device. As shown in FIG. 8, the computer device 100 may include one or more (only one is illustrated in the drawings) processor 1002 (the processor 1002 may include, but is not limited to a Micro Controller Unit (MCU) or a Field Programmable Gate Array (FPGA), or other processing apparatus), a memory 1004 for storing data, and a transmission apparatus 1006 for communications. Those of ordinary skills in the art will understand that the structure as shown in FIG. 8 is only schematic, and does not limit the structure of the electronic apparatus described above. For example, the computer device 10 may also include more or fewer components than that shown in FIG. 8, or have different configurations than that shown in FIG. 8.

The memory 1004 may be configured to store software programs and modules of application software, such as program instructions/modules corresponding to the data transmission method in the embodiments of the present disclosure. The processor 1002 executes various functional applications and data processing by running the software programs and modules stored in the memory 1004, i.e., implements the above method. The memory 1004 may include a high-speed random memory and may also include a non-volatile memory such as one or more magnetic storage devices, flash memory, or other non-volatile solid-state memory. In some examples, the memory 1004 may further include a memory remotely disposed with respect to the processor 1002, which may be connected to the computer device 100 through a network. Examples of the above networks include, but are not limited to, the Internet, enterprise intranets, local area networks, mobile communication networks, and combinations thereof.

The transmission apparatus 1006 is configured to receive or transmit data via one network. The specific example of the network described above may include a wireless network provided by a communication provider of the computer device 100. In one example, the transmission apparatus 1006 includes a Network Interface Controller (NIC) that can be connected to other network devices through a base station so as to be able to communicate with the Internet. In one example, the transmission apparatus 1006 may be a Radio Frequency (RF) module configured to communicate with the Internet wirelessly.

The technical solutions recorded in the embodiments of the present disclosure may be combined arbitrarily in case of no conflict.

In the several embodiments provided in the present disclosure, it should be understood that the disclosed methods and smart devices may be implemented in other ways. The device embodiments above are schematic only, for example, the division of units is only a logical function division, and there may be other division modes in actual implementation, for example: a plurality of units or components may be combined, or may be integrated into another system, or some features may be omitted or not executed. In addition, the shown or discussed mutual coupling or direct coupling or communication connection may be through some interfaces. The indirect coupling or communication connection between the devices or units may be electrical, mechanical or other forms.

The above-mentioned units illustrated as separated parts may be or may not be separated physically, and the parts displayed as units may be or may not be physical units. That is, the parts may be located at one place or distributed in multiple network units. Some or all of the units may be selected according to actual needs to achieve the objectives of the solutions in the embodiments.

In addition, each functional unit in each embodiment of the present disclosure may be integrated in one second processing unit, or each unit may exist alone physically, or two or more units may be integrated in one unit. The integrated units above may be implemented in the form of hardware, or in the form of hardware and software functional units.

The foregoing descriptions are merely detailed embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure.

What is claimed is:

1. A method for resuming a radio resource control (RRC) connection, comprising:
   receiving, by a first node, a notification message sent by a second node, wherein the notification message is used to notify the first node an arrival of downlink data at the second node side, and
   receiving, by the first node, second UE context on the second node side sent by the second node; wherein secondary cell group (SCG) configuration information comprises at least the second UE context on the second node side,
   wherein the first node is a master node in a dual connection network or a multi-connection network, and the second node is a secondary node in the dual connection network or the multi-connection network,
   wherein the method further comprises:
   receiving, by the first node, indication information sent by a terminal, wherein the indication information is used to request the first node to initiate resume of a resource on a SCG side,
   wherein the method further comprises:
   after determining a target second node, sending, by the first node, the SCG configuration information to the target second node, and configuring a new first calculation input parameter for calculating a key on the target second node side; and
   after obtaining a first dedicated random access channel (RACH) resource on the target second node side configured by the target second node, sending, by the first node, the first dedicated RACH resource and the first calculation input parameter to the terminal, so that the terminal initiates a random access process on the target second node side based on the first dedicated RACH resource and the first calculation input parameter.

2. The method according to claim 1, wherein the terminal is a terminal in a second type of RRC inactive state, the second type of RRC inactive state refers to a state which the terminal is in after suspending a part of the RRC connections, and the suspending a part of the RRC connections refers to suspending a resource of a SCG part.

3. The method according to claim 1, wherein the method further comprises:
receiving, by the first node, data bearer (DRB) identification information of a bearer corresponding to the downlink data.

4. The method according to claim 1, wherein the receiving, by the first node, the indication information sent by the terminal comprises:
receiving, by the first node, the indication information sent by the terminal at least through RRC signaling or a media access control control element (MAC CE).

5. An apparatus for resuming a radio resource control (RRC) connection, comprising:
a processor and a memory storing program instructions, wherein when the program instructions are executed by the processor, the apparatus is configured to:
receive a notification message sent by a second node, wherein the notification message is used to notify a first node an arrival of downlink data at the second node side; and
receive second UE context on the second node side sent by the second node; wherein second cell group (SCG) configuration information comprises at least the second UE context on the second node side,
wherein the first node is a master node in a dual connection network or a multi-connection network, and the second node is a secondary node in the dual connection network or the multi-connection network,
and the processor is further configured to:
receive indication information sent by a terminal, wherein the indication information is used to request the first node to initiate resume of a resource on a SCG side,
wherein the processor is further configured to:
determine a target second node;
send the SCG configuration information to the target second node;
configure a new first calculation input parameter for calculating a key on the target second node side;
obtain a first dedicated random access channel (RACH) resource on the target second node side configured by the target second node; and
send the first dedicated RACH resource and the first calculation input parameter to the terminal, so that the terminal initiates a random access process on the target second node side based on the first dedicated RACH resource and the first calculation input parameter.

6. The apparatus according to claim 5, wherein the terminal is a terminal in a second RRC inactive state, and the second RRC inactive state refers to a state which the terminal is in after suspending a part of the RRC connections, and the suspending a part of the RRC connections refers to suspending a resource of a SCG part.

7. The apparatus according to claim 5, wherein the processor is further configured to:
receive data bearer (DRB) identification information of a bear corresponding to the downlink data.

8. The apparatus according to claim 5, wherein the processor is further configured to receive the indication information sent by the terminal at least through RRC signaling or MAC CE.

9. The apparatus according to claim 5, wherein the indication information further carries set information or measurement result information of a cell on the second node side.

10. The apparatus according to claim 5, wherein the processor is further configured to determine the target second node based on a measurement result reported by the terminal.

11. The apparatus according to claim 5, wherein the processor is further configured to send the first dedicated RACH resource and the first calculation input parameter to the terminal through signaling or MAC CE or PDCCH order.

12. The apparatus according to claim 5, wherein when obtaining the first dedicated RACH resource on the target second node side configured by the target second node, the processor is further configured to obtain system broadcast information on the target second node side configured by the target second node.

13. The apparatus according to claim 12, wherein the processor is further configured to:
send the system broadcast information on the target second node side to the terminal through RRC signaling.

14. A computer storage medium on which computer-executable instructions are stored, which when executed by a processor implements:
receiving, by a first node, a notification message sent by a second node, wherein the notification message is used to notify the first node an arrival of downlink data at the second node side,
receiving, by the first node, second UE context on the second node side sent by the second node; wherein secondary cell group (SCG) configuration information comprises at least the second UE context on the second node side,
and
receiving, by the first node, indication information sent by a terminal, wherein the indication information is used to request the first node to initiate resume of a resource on a SCG side,
wherein the first node is a master node in a dual connection network or a multi-connection network, and the second node is a secondary node in the dual connection network or the multi-connection network,
wherein the processor is further configured to:
determine a target second node;
send the SCG configuration information to the target second node;
configure a new first calculation input parameter for calculating a key on the target second node side;
obtain a first dedicated random access channel (RACH) resource on the target second node side configured by the target second node; and
send the first dedicated RACH resource and the first calculation input parameter to the terminal, so that the terminal initiates a random access process on the target second node side based on the first dedicated RACH resource and the first calculation input parameter.

15. The computer storage medium according to claim 14, wherein the terminal is a terminal in a second type of RRC inactive state, the second type of RRC inactive state refers to a state which the terminal is in after suspending a part of the RRC connections, and the suspending a part of the RRC connections refers to suspending a resource of a SCG part.

16. The computer storage medium according to claim 14, wherein the processor is further configured to:

receive data bearer (DRB) identification information of a bearer corresponding to the downlink data.

17. The computer storage medium according to claim 14, wherein the processor is further configured to:
receive the indication information sent by the terminal at least through RRC signaling or a media access control control element (MAC CE).

* * * * *